Aug. 8, 1961      H. C. LIEBMANN, JR      2,994,910
HIDE PULLER WITH OPERATOR'S PLATFORM AND CONVEYOR INTERLOCK
Original Filed July 13, 1954      3 Sheets-Sheet 1

Herbert C. Liebmann, Jr.
INVENTOR.

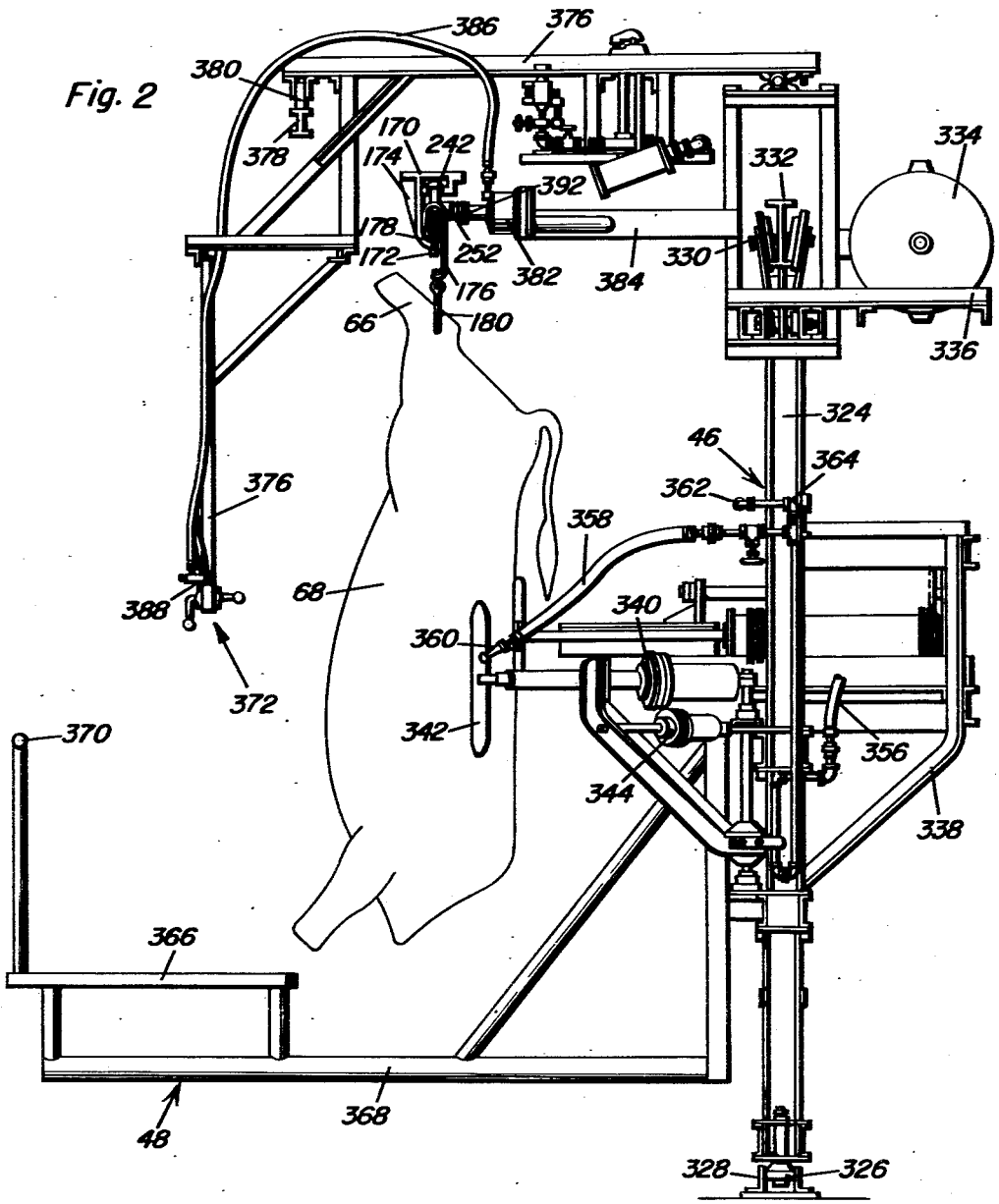

Aug. 8, 1961        H. C. LIEBMANN, JR        2,994,910
HIDE PULLER WITH OPERATOR'S PLATFORM AND CONVEYOR INTERLOCK
Original Filed July 13, 1954        3 Sheets-Sheet 3
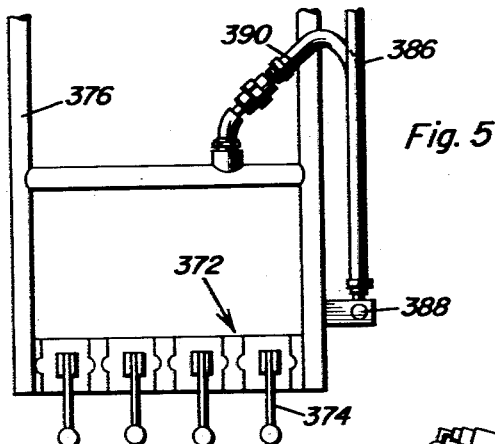
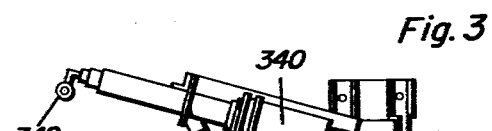
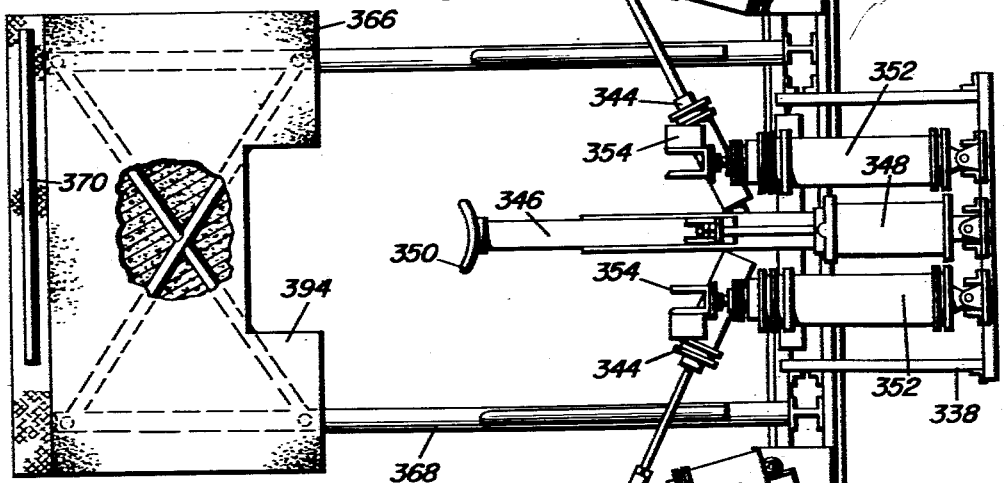
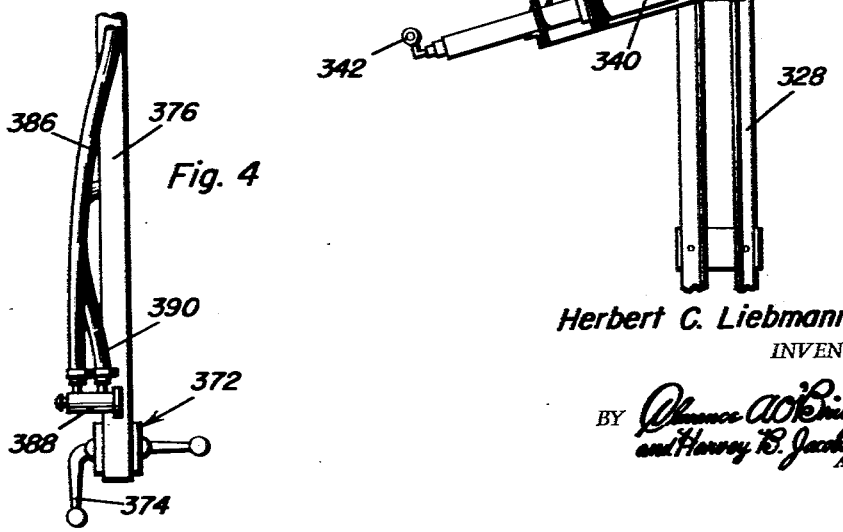
Herbert C. Liebmann, Jr.
INVENTOR.

United States Patent Office 2,994,910
Patented Aug. 8, 1961

1

2,994,910
HIDE PULLER WITH OPERATOR'S PLATFORM AND CONVEYOR INTERLOCK
Herbert C. Liebmann, Jr., Green Bay, Wis., assignor to Liebmann Packing Company, a corporation of Wisconsin
Original application July 13, 1954, Ser. No. 443,044, now Patent No. 2,883,700, dated Apr. 28, 1959. Divided and this application Mar. 3, 1959, Ser. No. 796,780
2 Claims. (Cl. 17—21)

The present invention generally relates to a hide puller for use in removing hide from carcasses of beef cattle in a meat packing plant and this application is a division of copending application Serial No. 443,044, filed July 13, 1954, for Process and Apparatus for Slaughtering Animals, now Patent No. 2,883,700.

The primary object of the present invention is to provide a hide puller for removing hide from carcasses being transported on an overhead conveying system in which the hide puller is provided with an operator's platform and control assembly with the entire hide puller being movable with the conveying assembly and carcass during the hide pulling operation and subsequently returning, by gravity, to a predetermined position while awaiting the next carcass whereby the hide puller will not stop the conveying system from operating but will effect its operation during movement with the conveying system.

Another object of the present invention is to provide a hide puller in which the carcass engaging elements are provided with sterilizing means for maintaining the same in a clean and sterile condition.

A further important object of the present invention is to provide a hide puller incorporating novel means for centralizing the carcass in relation to the hide puller and having a novel operator's platform disposed in facing relation to the hide puller for providing accurate and positive control for the hide puller.

Yet another feature of the present invention is to provide a hide puller which is simple in construction, easy to use, efficient in operation, clean and sterile, dependable and long lasting and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an end elevational view taken substantially at right angles to the plane of FIGURE 1 showing further structural details of the hide pulling mechanism together with the operator's platform and the controls for manipulating the hide puller and for positioning the carcass centrally of the hide puller;

FIGURE 3 is a top plan view of the hide puller of the present invention with portions omitted for clarity together with a portion of the platform being in section showing the details of construction thereof;

FIGURE 4 is an enlarged view of the control mechanism for the hide puller and the carcass positioning means; and FIGURE 5 is a side elevational view of the construc-

Figure 1:
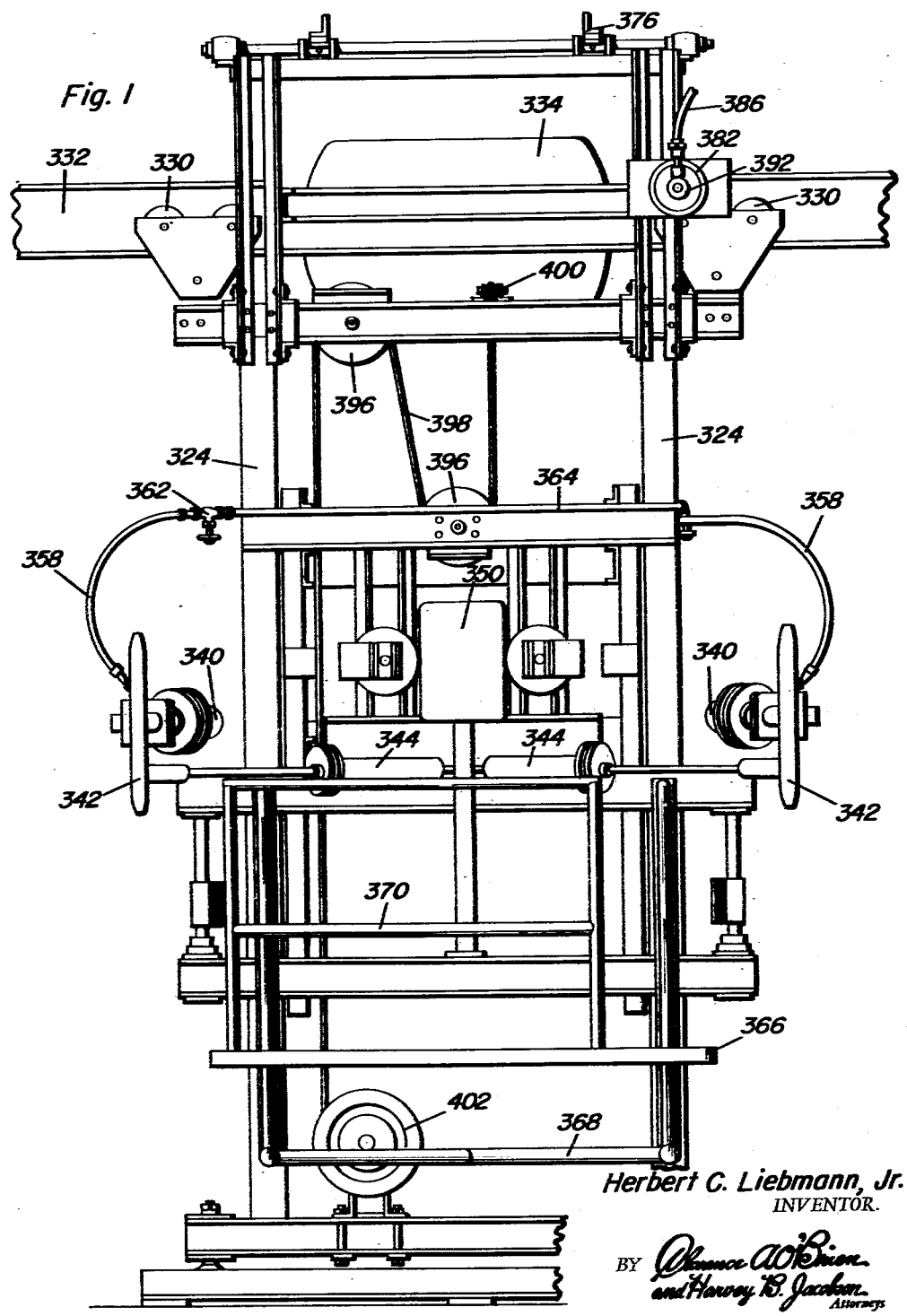
FIGURE 1 is a side elevational view showing the construction of the hide puller of the present invention with parts being omitted.

2 tion of FIGURE 4 showing further structural details of the control mechanism for operation of the hide puller by the operator standing on the operator's platform.

Referring now specifically to the drawings, it will be seen that the hide puller 46 includes generally a vertical upright frame 324 having spaced vertical members. A pair of rollers 326 are positioned on the lower end of the frame and rotate about a vertical axis between members 328 wherein the bottom end of the frame 324 is guided in horizontal sliding movement. The upper ends of the frame 324 is provided with outwardly inclined sets of rollers 330 engaging the lower flange of a supporting I-beam 332 that is inclined downwardly towards the flow of the carcasses that enter into the hide pulling station, for a purpose described hereinafter. A pressure tank 334 is positioned on a suitable bracket 336 rearwardly of the frame 324 for movement therewith. Further, it will be understood that the entire hide puller 46 moves along the supporting rail 332 and is guided by the lower rollers 326. Secured to bracket means 338 and disposed between and forwardly of the frame 324 is a pair of remotely positioned pulling piston and cylinder arrangements 340 having hide gripping means in the form of grippers 342 on the outer ends thereof. Positioned between a stationary central member and each of the pulling hydraulic cylinder arrangements 340 is a hydraulic piston and cylinder arrangement 344 wherein the piston and cylinder arrangement 344 adjusts the angular position of the pulling piston and cylinder arrangements 340. A central pusher element 346 in the form of a hydraulic piston and cylinder arrangement 348 is provided with a generally concave member 350 on the outer end thereof for engaging the back portion of a carcass for a purpose described hereinafter. A set of hydraulic pushing piston and cylinder arrangements 352 are positioned on each side of the central element 346 and are provided with end portions 354 for engaging the carcass in a manner to be described. Further, it will be seen that each of the hydraulic piston and cylinder arrangements is provided with a supply line 356 for controlling the operation thereof.

As specifically shown in FIGURE 2, each of the grippers 342 is provided with a flexible conduit 358 that is connected to a suitable fitting 360 thereon and connected by valve means 362 to a sterilizing fluid line 364. The operator's platform 366 is positioned on a bracket 368 that is secured to the hide puller 46, and the platform 366 is provided with a suitable guard 370 for supporting the operator of the hide puller 46 in position wherein access may be had to the control panel generally indicated by the numeral 372 for manipulating the various hydraulic cylinder and piston arrangements of the hide puller 46 wherein the hide is removed from the carcass 68. The control panel 372 is provided with a plurality of control handles 374 that directly control the hydraulic cylinder and piston arrangements through suitable flexible conduits (not shown). It will be seen in FIGURE 2 that the control panel 372 is supported from an overhead bracket 376 that has its outer end supported on a rail 378 by a roller 380 wherein the bracket 376 and control panel 372 may move with the hide puller 46.

A cylinder 382 is secured to a bracket 384 positioned below the bracket 376 and is provided with a control line 386 that is connected to a push button valve 388 on control panel 372. Valve 388 is in communication with a conduit 390 for supplying air pressure to the cylinder 382. A piston 392 extends from the cylinder 382 and is engaged by a lug 252 on an overhead conveyor chain 242 when the piston is extended, thereby moving the entire hide puller during the hide stripping operation due to the engagement of lug with the projecting end of the piston 392. The hide puller 46 normally moves to the end of the downwardly inclined rail 332 that is nearest to the brisket saw station and the projecting piston 392 is extended into the path of movement of the lug 252 on the continuous conveying chain 242. As the lug 252 moves along, it engages the projecting piston 392, thereby aligning the shackle 176 and the carcass 68 in exact centered relation to the hide puller 46, thereby permitting the operator standing on the operator's platform 366 to engage the grippers 342 with the hide and manipulate the control panel 372 in a most efficient manner for removing the hide. Each shackle 176 is provided with a hook 180 engaging a dressed leg 66 on carcass 68. Also, the shackles are movably supported on a first overhead rail 172 by rollers 178 and the rail 172 is supported by brackets 170 reinforced by webs 174. As the chain 242 continues to move, the projecting piston 392 will cause the entire hide puller 46 to move along supporting rail 332 as guided by the rollers 326 and members 328 at the bottom thereof so that the hide pulling operation is carried out during the continuous movement of the carcass 68, thereby retaining the carcass 68 and the hide puller 46 in correct relative position. After the hide has been pulled from the carcass 68, the operator engages the push button valve 388, thereby retracting the piston 392 for release of lug 252 and permitting the carcass 68 and the chain 242 to continue in its movement and also allowing the hide puller 46 to proceed downwardly along the inclined rail 332 towards the brisket saw station, thereby positioning the hide puller 46 for a repeat operation.

Sterilizing water is supplied to the grippers 342 while the pulling piston and cylinder arrangements 340 are at the extended position and while the grippers are being secured to the hide. In pulling hide from the carcass 68, the hydraulic piston and cylinder arrangements 344 are extended and arrangements 340 are extended while the grippers 342 are attached to the hide. The pulling arrangements 340 are then retracted and the arrangements 344 are also retracted, thereby partially pulling the hide away from the carcass. The central pusher arrangement 348 is then extended, thereby pushing the carcass away from the grippers 342, and the arrangements 344 cause the end portions 354 to engage the carcass and to help peel the hide completely from the flanks or rear meat portion of the carcass. The pulling arrangements 340 are then retracted and the grippers 342 released, wherein the cycle is then complete. The sterilizing water is shut off during a portion of the time that the grippers are not in use in order to conserve water and also to keep water off the hide and carcass and to prevent splashing and burning of nearby workmen by the sterilizing water which is heated to a relatively high degree. It also will be seen that the platform 366 is provided with a recessed central area 394 for permitting drainage of the sterilizing water and also fluids from the carcass into a drainage pit positioned under the platform. Obviously, the platform and the various gripping and pushing and pulling arrangements may be adjustably positioned for correct positioning of the platform 366 in relation to the hide pulling machine 46.

As shown in FIGURE 1, a series of pulleys 396 are mounted on the frame 324 and hide puller 46 respectively and a cable 398 passes thereover, and the cable 398 being secured at one end to a frame member by bracket means 400. The other end of the cable 398 is positioned around a winch 402 driven by a suitable electric motor (not shown) that is mounted on the bottom of frame 324 for raising and lowering the hide puller thereon.

After the carcass has been opened by a brisket saw, it is positioned in centered relation to the hide puller 46. The hide puller 46 is supported on the second overhead rail 332 and guided by the lower members 328 and the rollers 326 for horizontal movement during the hide pulling operation. The rail 332 is inclined downwardly towards the brisket sawing station wherein the force of gravity will normally position the hide pulling machine 46 adjacent the brisket sawing station. The cylinder 382 is provided with a projecting piston 392 that projects into the path of movement of the lugs or projections 252 on the continuous conveying chain 242 wherein the lugs 252 will engage the piston 392 during the movement of the chain 242. When the piston 392 is in engagement with a lug 252, the carcass 68 is centrally positioned in relation to the hide puller 46. Also, the piston 392 remains in contact with the lug 252, thereby moving the entire hide puller 46 along the overhead rail 332 as guided by the rollers 326 wherein the hide puller 46 and the carcass 68 are moved along at the same speed with the carcass in centered relation. The hide pulling machine 46 is adjusted vertically by manipulating the winch 402 in an obvious manner. Further, the operator positioned on the platform 366 moves along with the hide puller 46 and is provided with a control valve 388 for retracting the piston 392, thereby releasing the hide puller 46 from the chain 242 when the hide pulling operation is complete, thereby permitting the hide puller 46 to return by gravity towards the brisket sawing station due to the inclined relation of the rail 332. The hide puller 46 is provided with a plurality of hydraulically extensible and contractible cylinder and piston arrangements for gripping and pulling the hide from the carcass 68 together with a back engaging member for pushing the back, thereby completely peeling the hide from the carcass 68. The grippers 342 for gripping the hide are provided with sterilizing openings for receiving sterilizing water from a conduit 358 wherein the grippers that actually engage the hide and engage the dressed carcass 68 are retained in a sanitary and sterilized condition at all times, thereby assuring that the rigid sanitation requirements of a slaughter house will be met.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a first overhead supporting rail having a plurality of carcass supporting shackles movably disposed thereon, and an endless conveying chain engaged with the shackles for moving the shackles along the rail, a hide pulling device comprising a vertically disposed frame, a second overhead rail laterally spaced from said first overhead rail and movably supporting said frame, a plurality of fluid pressure operated expansion and contraction members each having one end mounted on said frame, each of said members including hide gripping means on the other end thereof whereby the hide of a carcass may be gripped and pulled away from the carcass, and means mounted on said frame for engaging the conveying chain and locking the frame to the conveying chain for positively moving the hide pulling device with the chain and carcass during the hide pulling operation thereby maintaining a constant relationship between the hide pulling device and the carcass, said means including fluid pressure operated cylinder and piston, said piston being movable towards and away from the conveying chain, said conveying chain having a laterally extending lug thereon, said piston being disposed in the path of movement of the lug when the piston is extended toward the chain whereby the lug will engage the piston and move the hide puller with the chain.

2. The combination of claim 1 wherein said second overhead rail is inclined upwardly in the direction of travel of the conveying chain whereby the force of gravity will return the hide pulling device to a normal position after the hide pulling operation has been completed and the piston retracted from the path of movement of the lug.

References Cited in the file of this patent

UNITED STATES PATENTS

| | | |
|---|---|---|
| 2,596,481 | Hincks | May 13, 1952 |
| 2,696,633 | Hincks | Dec. 14, 1954 |